UNITED STATES PATENT OFFICE.

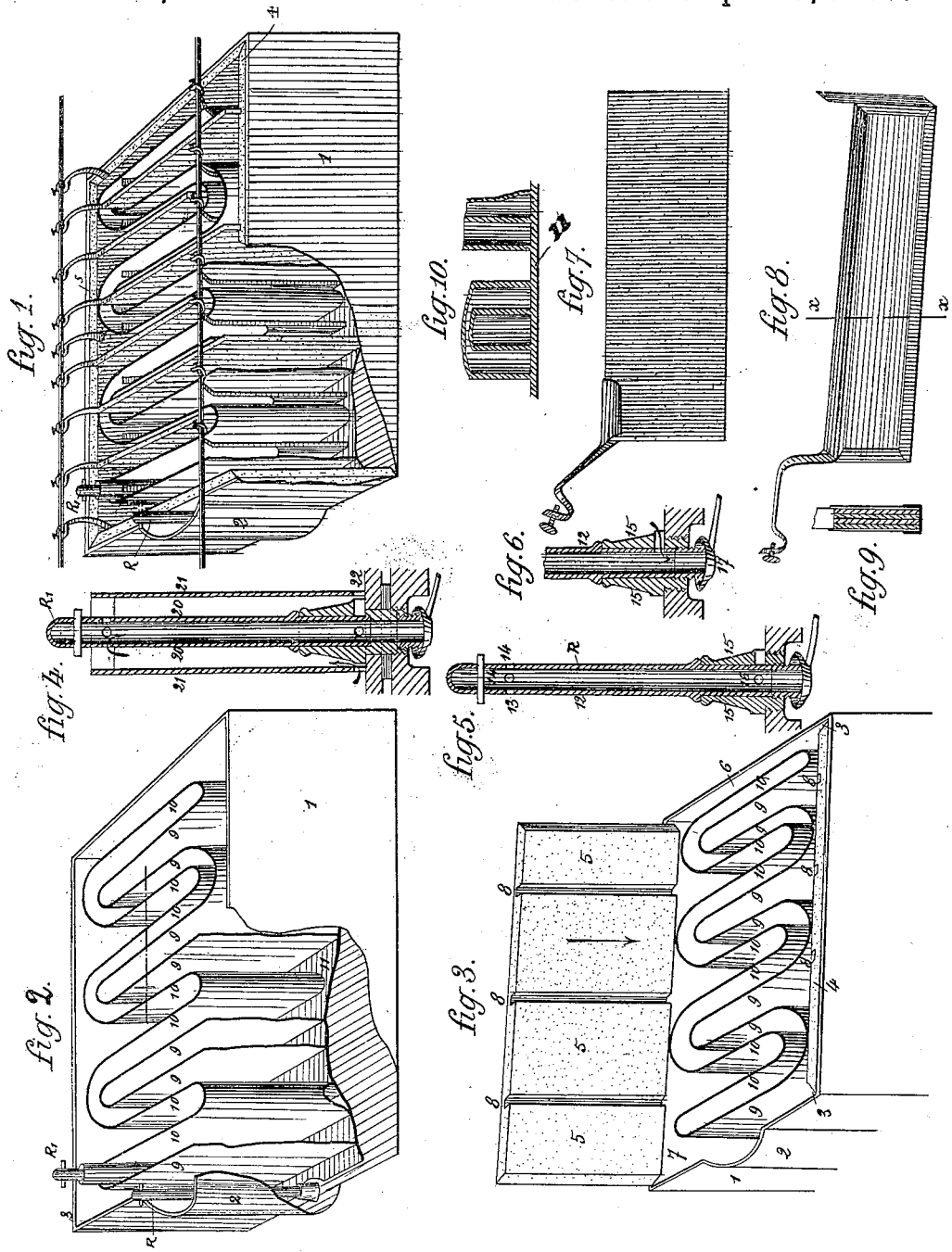

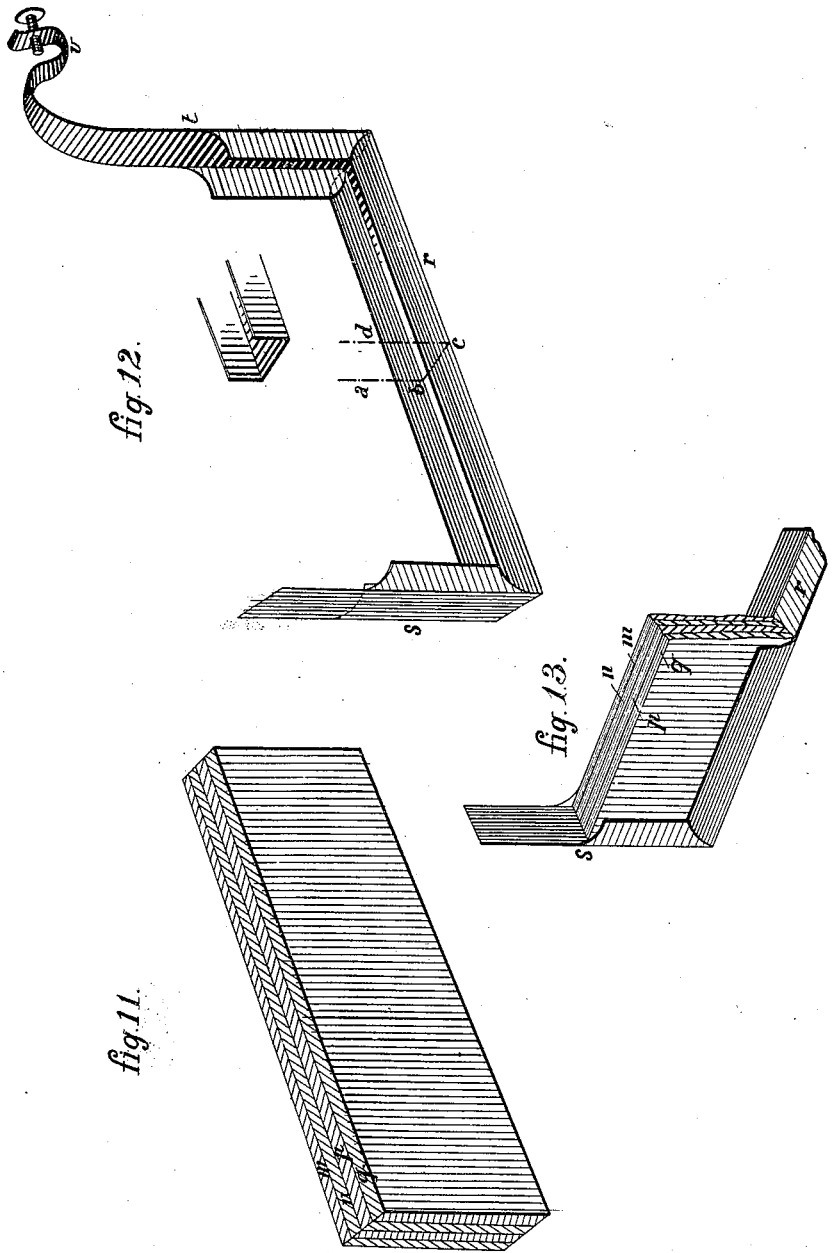

FERNAND GENDRON, OF BORDEAUX, GIRONDE, FRANCE.

GALVANIC BATTERY.

SPECIFICATION forming part of Letters Patent No. 426,932, dated April 29, 1890.

Application filed February 8, 1889. Serial No. 299,155. (No model.)

*To all whom it may concern:*

Be it known that I, FERNAND GENDRON, a citizen of France, residing at Bordeaux, in the Department of the Gironde, have invented certain new and useful Improvements in Electric Batteries; and I do hereby declare that the following is a full, clear, and exact description of the same.

My invention has for its object a new system of electric battery employing two liquids and of great power. The liquids generally used are acidulated water as an exciter and a solution of bichromate of soda or of potash as a depolarizing liquid. The feeding of the liquids is easy, the level of the liquids is always the same, and the discharge of the thoroughly-exhausted liquids is assured.

The drawings annexed to the present specification will aid in the understanding of my perfected battery, and in them Figure 1 shows a perspective view of the battery in working position. Certain parts are broken away in order to represent better all the constituent parts. Fig. 2 shows the exterior casing wherein the porous cell is arranged. The discharge-pipes for the two liquids are also shown in this figure. Fig. 3 shows the arrangement of the carbon plates or negative electrodes. Figs. 4 and 5 show details of the discharge-pipes, Fig. 4 of the one belonging to the porous cell, and Fig. 5 of the one belonging to the exterior casing. Fig. 6 shows the manner in which those pipes are attached to the inside of the bottom. Fig. 7 shows a carbon electrode. Fig. 8 shows one of the zinc electrodes. Fig. 9 shows a transverse section of such an electrode. Fig. 10 shows a transverse section of a part of the porous cell. Fig. 11 is a view of the laminated zinc plate forming my soluble electrode. Fig. 12 is a holder for the same. Fig. 13 is a view of the holder, part being broken away to show the plate in place therein.

The exterior casing 1 can be made of any material capable of resisting the acids. It has preferably a rectangular form and only a moderate height. On one of its sides, and by preference in the middle of this side, a circular enlargement 2 is arranged, wherein the exhaust-pipe is lodged. Fig. 3 shows plainly the manner in which the exterior casing is lined. It shows at 4 a plate of carbon arranged in its place, while on the opposite side a similar carbon plate 5 is seen in a position to be pushed downward in its place against the inside of the casing 1. The places 6 and 7 for the end plates are still empty. The plates 4 and 5 are grooved at 8 8 for the reception of transverse carbon plates, which form the negative electrode. As shown in Fig. 1, these carbon plates are arranged bearing alternately against plate 4 or plate 5, by which arrangement the liquid of the exterior casing, which is poured in near plate 6, is compelled to pass around all those plates before arriving in the neighborhood of the exhaust-chamber 2.

The porous cell is formed in one long piece of a slight height, and the two parallel sides of it are curved in and out in such a way as to form parallel compartments, as plainly shown in the Figs. 2 and 3. The parallel sides are at a distance of about twenty-five millimeters from each other. The porous cell, consequently, is a winding and narrow canal closed at both ends. This porous cell rests on a plate of the same material 11, Figs. 2 and 10, which forms the bottom of the porous vessel. This bottom is provided with a hole for the reception of the exhaust-pipe R', Figs. 1 and 5. By placing the porous vessel 9 10 in the exterior casing a series of parallel compartments are formed, which become alternately parts of the exterior positive vessel or parts of the porous negative vessel, one negative compartment being always placed between two positive compartments. All the porous compartments are in connection with each other, and this is also the case for all the compartments of the exterior vessel. By these methods of construction we obtain, in a limited room, a large surface, (fifty decimeters about, of working-surface for a battery measuring forty centimeters by sixteen centimeters in height,) and are also enabled to make parallel all working and depolarizing surfaces, which are directly opposed. Furthermore, those surfaces are approached to each other as much as possible by arranging between them strata of liquids of a large section and of a slight width, and all compartments of the same denomination are in free communication, while with a medium discharge a real current is formed in those compartments.

The soluble electrode is formed of as many pieces of zinc as there are compartments in the porous vessel. These pieces are entirely immersed in the liquid excitant, which assures their entire and regular wear. The zinc elements which constitute together the soluble electrode are formed as shown in Figs. 11, 12, and 13. Instead of taking for the formation of those electrodes thick metallic masses I form them of sheets of laminated zinc, which may be found in the trade for industrial use, to cover ships, gutters, &c. These sheets, which must be of a good quality of metal and which can be procured easily and at a moderate price, are cut with plate-shears to the dimensions of the electrode. The sheets are then each separately amalgamated, and afterward the necessary number to form the electrode are joined together or superposed. This electrode consequently is formed of a number of amalgamated zinc sheets applied one on the other, and consequently presenting to the action of the liquid of the vessel the exterior faces of the two outside sheets only.

It must be well understood that my system of construction of soluble electrodes secures the continual keeping of the amalgamation, whatever may be their condition of wear. Such is not the case with the massive electrodes, which must be frequently amalgamated before being completely worn.

The drawings annexed to this specification plainly show the construction of this system of electrodes. $m\ n\ p\ q$ are the zinc sheets, put one on the other after being amalgamated. They are contained in a holder, formed into a three-sided frame, as shown in Fig. 12. The bottom $r$ bears on the bottom of the porous cell, and the two upright sides $s$ and $t$ emerge from the liquid. The frame is provided on the inside with grooves for the reception of the plates, and is made by preference of amalgamated red copper, because the liquids do not affect this metal, which is at the same time an excellent conductor. The grooves, arranged in the horizontal part or the bottom $r$ of this holder, serve also for the purpose of collecting the mercury, which is detached from the amalgamated sheets. It is well to be understood that all rights to make these frames of another material are reserved.

The holder is provided with an extension $v$ to connect the zinc with the conductor, either by means of a screw or by soldering, as it is usual in the practice. These electrodes have the advantage among others that the zinc plates can be easily and without interrupting the working of the battery be turned end for end or face for face, and that they can be used to the last sheet without requiring any care.

The negative electrode (positive pole) is formed by plates of retort or agglomerated carbon, and is arranged in the spaces left open by the windings of the porous cell. The four interior carbon linings make part of this electrode. Each of the plates is provided with a metallic extension, ending in a hook and arranged similar to those of the holders for the zinc electrodes, and which have also for their purpose to unite all the currents on a single conductor. These carbon-plates emerge for a distance of several centimeters out of the liquid, and may be even higher than the vessel and are of a considerable thickness. I have multiplied for the carbon electrode the number of plates and the number of points where they take the current with the double purpose of using carbon-plates of a common construction, and especially to make up for the known feeble conductivity of carbon for intense currents. Experience has shown this insufficient conductivity of single carbon-plates, because in cases where it has been deemed sufficient to give a great carbon electrode only one contact, even if the carbon has been of a considerable surface, the apparatus has become heated and a great deal of energy has been thereby lost.

The exhaust-pipes R R' work in the following manner: The pipe R serving for the depolarizing liquid of the exterior vessel 1 is placed in the part 2 between the inside of the casing and the carbon-plate 7, which is provided with an opening on its under end opposite the chamber 2. The exhausted liquid, which through its density goes to the bottom of the vessel, can by this way penetrate into the chamber 2, and as fast as fresh liquid is introduced in the other end the exhausted liquid is driven into the chamber 2, where the liquid will of course be at a level with that in the exterior vessel, because the vessels communicate. Consequently the chamber 2 is constantly filled with exhausted liquid, and so the pipe 12, which is attached to the bottom, as shown in Fig. 6, is of course surrounded by exhausted liquid. As fresh liquid is fed into the outer chamber, the level of the exhausted liquid will also rise, and as soon as it reaches 13 it finds in the pipe 12 openings 14, allowing it to flow through the interior of the pipe. Fig. 5 shows the foot of this pipe 12, which is attached to a nut 15, screwed to the bottom. The discharge-opening is at the under end of the pipe and the exhausted liquid drops into a small reservoir, from which it may be conducted to the sewer in any suitable way. The tube R', which serves for the discharge of the liquid out of the porous cell, is constructed and works in a similar way—it is shown in 20, Fig. 4—and instead of a chamber 2, I prefer to use a plain concentric tube 21, provided at its lower end with openings 22. The exhausted liquid rises between the two pipes until its surface reaches the overflow-openings, when it escapes, as above described.

It is easily to be understood that with a constant feeding of the liquids the discharge of the exhausted liquid must also be constant.

Fig. 6 shows a position of the pipe wherein this pipe works like a cock and allows the complete cleaning of the corresponding vessel. Mud-cocks might of course also be applied for this purpose if the turning-pipe should be objected to.

The contact-points of all negative electrodes may be united on one rod, either by a screw arrangement or by soldering, as shown in Fig. 1.

Having thus described my invention and reserving for myself the right to make any modification of the arrangement of any of the parts of the apparatus, and also the proportions, dimensions, and materials used in the construction I claim as new and desire to secure by Letters Patent—

1. In an electric battery, the combination, with an exterior casing, of a porous cell formed in one long piece with connected parallel compartments, substantially as set forth.

2. In an electric battery, the combination, with the exterior casing, of the removable electrode-plates 4 5, fitting said casing and having grooves 8, and the transverse electrode-plates fitting said grooves, substantially as set forth.

3. In an electric battery, the herein-described electrode, consisting of a series of metallic plates superposed upon each other, each plate being amalgamated upon both sides, and means for holding said plates together, consisting of a flanged frame in which said plates fit side by side, substantially as set forth.

4. In an electric battery, the combination, with the exterior casing and the porous cell forming with said casing a series of parallel compartments, of electrode-plates situated in said compartments and adapted to obstruct the passage of the liquid, substantially as set forth.

5. In an electric battery, a zigzag or S-shaped porous cell, substantially as set forth.

6. In an electric battery, an overflow comprising a pipe or compartment having an opening at or near its bottom to receive the exhausted liquid, and a second pipe or duct situated within said compartment adapted at its top to receive said liquid, and leading through the bottom to the exterior of the battery, substantially as set forth.

7. In an electric battery, the combination, with the casing, of a sleeve or bearing secured therein and having a lateral opening, and an overflow-pipe fitting and adapted to turn in said bearing and having a corresponding opening, substantially as set forth.

In testimony whereof I have signed this specification in the presence of two subscribing witnesses.

FERNAND GENDRON.

Witnesses:
RENÉ DUPRATE,
GREGORY PHELAN.